(12) United States Patent
Waeller et al.

(10) Patent No.: US 9,898,083 B2
(45) Date of Patent: Feb. 20, 2018

(54) METHOD FOR OPERATING A MOTOR VEHICLE HAVING A TOUCH SCREEN

(75) Inventors: Christoph Waeller, Braunschweig (DE); Katharina Bachfischer, Duesseldorf (DE)

(73) Assignee: Volkswagen AG, Wolfsburg (DE)

( * ) Notice: Subject to any disclaimer, the term of this patent is extended or adjusted under 35 U.S.C. 154(b) by 619 days.

(21) Appl. No.: 13/138,399

(22) PCT Filed: Jan. 25, 2010

(86) PCT No.: PCT/EP2010/000413
§ 371 (c)(1),
(2), (4) Date: Oct. 27, 2011

(87) PCT Pub. No.: WO2010/089036
PCT Pub. Date: Aug. 12, 2010

(65) Prior Publication Data
US 2012/0032899 A1   Feb. 9, 2012

(30) Foreign Application Priority Data

Feb. 9, 2009   (DE) ........................ 10 2009 008 041

(51) Int. Cl.
*G09G 1/00*   (2006.01)
*G06F 3/01*   (2006.01)
(Continued)

(52) U.S. Cl.
CPC .......... *G06F 3/016* (2013.01); *G01C 21/3664* (2013.01); *G06F 3/04883* (2013.01); *G06F 2203/014* (2013.01)

(58) Field of Classification Search
CPC ....... H03K 17/94; G06F 1/00; G06F 3/04883; G06F 3/04842; G06F 3/017; G06F 3/0488; G06F 3/04817; G06F 3/0416
(Continued)

(56) References Cited

U.S. PATENT DOCUMENTS 5,270,689 A   12/1993  Hermann
5,764,222 A    6/1998  Shieh
(Continued)

FOREIGN PATENT DOCUMENTS

CN      1860429 A      11/2006
DE    196 38 015        3/1998
(Continued)

OTHER PUBLICATIONS

International Preliminary Report on Patentability, issued in corresponding International Application No. PCT/EP2010/000413.
(Continued)

*Primary Examiner* — Michael Faragalla
(74) *Attorney, Agent, or Firm* — Andrews Kurth Kenyon LLP

(57) ABSTRACT

In a method for operating a motor vehicle having a display for displaying variable information, and a touch screen, situated above the display, for inputting commands by touching the touch screen, an operating element for operating a function of the motor vehicle is shown by the display, by touching the touch screen in the region of the operating element, and the function of the motor vehicle is executed based on a gesture of a hand executed in the vicinity of the touch screen, without touching the touch screen.

21 Claims, 5 Drawing Sheets

(51) Int. Cl.
*G01C 21/36* (2006.01)
*G06F 3/0488* (2013.01)

(58) Field of Classification Search
USPC .................................................. 345/173, 174
See application file for complete search history.

(56) References Cited

U.S. PATENT DOCUMENTS

| | | | |
|---|---|---|---|
| 5,790,104 | A | 8/1998 | Shieh |
| 5,933,134 | A | 8/1999 | Shieh |
| 6,067,081 | A | 5/2000 | Hahlganss et al. |
| 7,030,861 | B1 | 4/2006 | Westerman et al. |
| 7,084,859 | B1* | 8/2006 | Pryor ................. G01C 21/3664 345/156 |
| 7,126,579 | B2 | 10/2006 | Ritter |
| 7,342,485 | B2 | 3/2008 | Joehl |
| 7,447,575 | B2 | 11/2008 | Goldbeck et al. |
| 2003/0048280 | A1 | 3/2003 | Russell |
| 2006/0125803 | A1 | 6/2006 | Westerman et al. |
| 2006/0146037 | A1 | 7/2006 | Prados et al. |
| 2006/0161871 | A1 | 7/2006 | Hotelling et al. |
| 2007/0024592 | A1 | 2/2007 | Fry |
| 2007/0124694 | A1 | 5/2007 | Van De Sluis et al. |
| 2007/0146341 | A1 | 6/2007 | Medler et al. |
| 2007/0182718 | A1 | 8/2007 | Schoener et al. |
| 2008/0024457 | A1 | 1/2008 | Fliegner et al. |
| 2008/0180402 | A1* | 7/2008 | Yoo ........................ G06F 3/0481 345/173 |
| 2008/0192024 | A1 | 8/2008 | Mita |
| 2009/0140698 | A1* | 6/2009 | Eberhard ................ H02J 7/045 320/152 |
| 2009/0315740 | A1* | 12/2009 | Hildreth .................. G06F 3/017 341/20 |

FOREIGN PATENT DOCUMENTS

| | | |
|---|---|---|
| DE | 197 02 225 | 5/1998 |
| DE | 197 53 742 | 6/1999 |
| DE | 101 39 693 | 5/2002 |
| DE | 103 21 964 | 12/2004 |
| DE | 103 24 579 | 12/2004 |
| DE | 10 2004 037 644 | 2/2005 |
| DE | 103 42 666 | 4/2005 |
| DE | 10 2004 040 886 | 3/2006 |
| DE | 10 2004 061 419 | 7/2006 |
| DE | 10 2005 038 161 | 7/2006 |
| DE | 10 2005 035 111 | 9/2006 |
| DE | 10 2005 047 650 | 4/2007 |
| DE | 10 2005 047 939 | 4/2007 |
| DE | 10 2006 029 506 | 5/2007 |
| EP | 0 366 132 | 5/1990 |
| GB | 2 418 741 | 4/2006 |
| JP | 2000-075991 | 3/2000 |
| JP | 2004-507724 | 3/2004 |
| KR | 10-2007-0089297 | 8/2007 |
| WO | WO 97/18547 | 5/1997 |
| WO | WO 02/16875 | 2/2002 |
| WO | WO 2008/001202 | 1/2008 |

OTHER PUBLICATIONS

International Search Report, issued in corresponding International Application No. PCT/EP2010/000413.

Written Opinion, issued in corresponding International Application No. PCT/EP2010/000413.

\* cited by examiner

METHOD FOR OPERATING A MOTOR VEHICLE HAVING A TOUCH SCREEN

FIELD OF THE INVENTION

The present invention relates to a method for operating a motor vehicle having a display for displaying variable information, and a touch screen, situated above the display, for inputting commands by touching the touch screen.

BACKGROUND INFORMATION

According to German Published Patent Application No. 101 39 693, in modern electronic devices in a vehicle which constantly offer additional functions with more and more options, multi-function operating elements, by which various functions of the connected devices can be controlled, have been created due to the limited installation space for the associated operating elements. Thus European Published Patent Application No. 0 366 132, for example, describes a multifunction operating device for motor vehicles, for which function groups and individual functions are selected with the aid of a rotary switch, and for which an ENTER function can be triggered, one and the same bidirectional rotary switch being used for selecting menus and individual functions. This rotary switch has click-stop positions, to which menus or individual functions are assigned, the ENTER function being able to be triggered by an axial motion of the rotary switch.

Furthermore, U.S. Patent Application Publication No. 2006/0146037, for instance, describes implementing similar, menu-driven operating concepts by touch screens in a motor vehicle. In this context, U.S. Patent Application Publication No. 2006/0146037 discloses an input device for a motor vehicle, which has a touch screen for the input of commands by touching a control panel or by exerting pressure on the control panel, an actuator for moving the touch screen in at least one direction with respect to a reference body, and a substantially U-shaped spring for the mechanical connection of the touch screen to the reference body.

German Published Patent Application No. 10 2006 029 506 discloses an input device for a motor vehicle, in which the input device includes a first display for the optical display of information, at least one second display, disposed above the first display, for the optical display of information, and a touch screen disposed above the second display, for inputting commands by touching a control panel of the touch screen, the second display being utilizable for the display of gesture recognition.

German Published Patent Application No. 103 42 666 discloses an operating system for a motor vehicle, which has an optical display unit for displaying at least one operating function, and at least one manual actuating device, which is assigned for operating the at least one displayed operating function of the optical display unit; at least one additional manual actuating device is provided and a sensor, which detects an approach towards the at least one additional actuating device, and an operating function assigned to the additional manual actuation device is able to be displayed on the optical display unit following the detected approach.

German Published Patent application No. 10 2005 035 111 discloses an operating and display system for a vehicle having a centrally disposed optical display unit, which simultaneously displays two different image outputs for different viewing angle ranges. A centrally placed operating element is provided and a detector unit, which detects an approach toward the central operating element as well as an operating action of the central operating element and assigns the detected operating action to a first viewing angle range or a second viewing angle range.

Additional operating concepts or man/machine interfaces are described in German Published Patent Application No. 197 53 742, German Published Patent Application No. 196 38 015, German Published Patent Application No. 10 2005 047 939, German Published Patent Application No. 10 2004 037 644, German Published Patent Application No. 10 2005 047 650, German Published Patent Application No. 10 2005 038 161, German Published Patent Application No. 10 2004 040 886, German Published Patent Application No. 10 2004 061 419, German Published Patent Application No. 103 24 579, German Published Patent Application No. 103 21 964, British Published Patent Application No. 2 418 741, U.S. Patent Application Publication No. 2006/0125803, U.S. Pat. No. 7,030,861, PCT International Published Patent Application No. WO 97/18547, German Published Patent Application No. 197 02 225, U.S. Pat. No. 5,764,222, U.S. Pat. No. 5,790,104, U.S. Pat. No. 5,933,134, and U.S. Patent Application Publication No. 2007/0024592.

SUMMARY

Example embodiments of the present invention improve a motor vehicle having a touch screen. Example embodiments of the present invention provide an operation or setting of functions of a motor vehicle that is especially suitable for motor vehicles.

Example embodiments of the present invention provide a motor vehicle having a display for displaying variable information and a touch screen, disposed above the display, in particular, for inputting commands by touching the touch screen, the motor vehicle including a control by which an operating element for operating or setting a function of the motor vehicle is displayable on the display by touching the touch screen, especially in the region of the operating element, the motor vehicle including a gesture recognition module for recognizing a gesture, executed especially in the vicinity of the touch screen, for implementing or initializing the execution of the function of the motor vehicle. Details and exemplary arrangements for gesture recognition may be gathered from individual documents mentioned in the introduction, especially German Published Patent Application No. 103 21 964. A display for the variable display of information within the present context may include a matrix display, a TFT or similar display, in particular.

A function of a motor vehicle in the present context, in particular, includes the receiving frequency of a radio, the volume of an acoustic output in the motor vehicle, a sound adjustment (type and balance), a map detail selection, a title selection, a destination selection and/or a temperature adjustment. A function of a motor vehicle in the present context, in particular, includes a function for which a setpoint value is to be set from among a selection of values, in particular continuous values. A function of a motor vehicle in the present context, in particular, includes a function that is adjustable in analog fashion, especially according to a scale. In example embodiments of the present invention the function of the motor vehicle includes scrolling through a list. In example embodiments of the present invention the function of the motor vehicle includes shifting a map detail. In example embodiments of the present invention the function of the motor vehicle includes scaling a map detail. In example embodiments of the present invention the function of the motor vehicle includes moving an element represented on the display.

In example embodiments of the present invention the function of the motor vehicle is executed by the control. In example embodiments of the present invention, the control may be used to transmit a signal for executing the function of the motor vehicle.

In example embodiments of the present invention the motor vehicle includes an actuator for producing haptic feedback when the touch screen is touched. Details for haptic feedback are described in U.S. Patent Application Publication No. 2006/0146037, for instance. The haptic feedback of the operation confirmation may take place when touching the touch screen, for instance (in the region of an operating element shown with the aid of the display). As an alternative or in addition, three-dimensional structures, e.g., for sensing a displayed operating element in tactile manner, may be implemented by haptic feedback.

Example embodiments of the present invention provide a method for-operating a motor vehicle having a display for displaying variable information, and a touch screen, situated above the display, in particular, for inputting commands by touching the touch screen; using the display, an operating element is shown for operating or setting a function of the motor vehicle by touching the touch screen, especially in the region of the operating element, the function of the motor vehicle being executed or the execution of the function of the motor vehicle being initiated in response to a hand gesture executed in particular in the vicinity of the touch screen, without touching the touch screen.

In example embodiments of the present invention the function of the motor vehicle includes scrolling through a list. In example embodiments of the present invention the function of the motor vehicle includes shifting a map detail. In example embodiments of the present invention the function of the motor vehicle includes scaling of a map detail. In example embodiments of the present invention the function of the motor vehicle includes moving an element represented on the display.

Furthermore, example embodiments of the present invention provide a method for operating a motor vehicle having a display for displaying variable information, and a touch screen, situated above the display, in particular, for inputting commands by touching the touch screen, a map detail being shown by the display, and the map detail being scaled and/or shifted in response to a gesture of a hand executed especially in the vicinity of the touch screen, without touching the touch screen.

In example embodiments of the present invention, by touching the touch screen, a location from the map detail displayed by the display is then selected as destination for route navigation.

If the touch screen is not situated above the display (and thus arranged as so-called touchpad), an operating element which is displayed by the display may also simply be information as to which function is able to be controlled just then using the touch screen.

In addition, an approach recognition may be provided as well, which is implemented with the aid of the gesture recognition module, for instance. If an approach recognition is provided, a change from a display mode to an operating mode may take place when a hand approaches a touch screen. In addition or as an alternative, it may be provided that a distinction is made, or may be made, between the operation by a driver and a passenger. As an alternative and in addition, the touch screen may also be arranged as a multi-touch function touch screen. For example, it may be provided that an operation is possible using multiple fingers simultaneously, the individual position of each finger being analyzed separately. Different functions of a touch-based gesture, for example, are able to be controlled as a function of the number of fingers used. Furthermore, it may be the case that route definitions and route estimates in a navigation system may be implemented by 2-finger 'circle' indications (see, for instance, www/jazzmutant.com/lemur_features.php and en.wikipedia.org/wiki/Multi-touch).

A motor vehicle in the present context, in particular, is, e.g., a land vehicle which may be used individually in road traffic. In particular, motor vehicles in the present context are not restricted to land vehicles having an internal combustion engine.

Further advantages and details are derived from the following description of exemplary embodiments.

DETAILED DESCRIPTION

Figure 1:
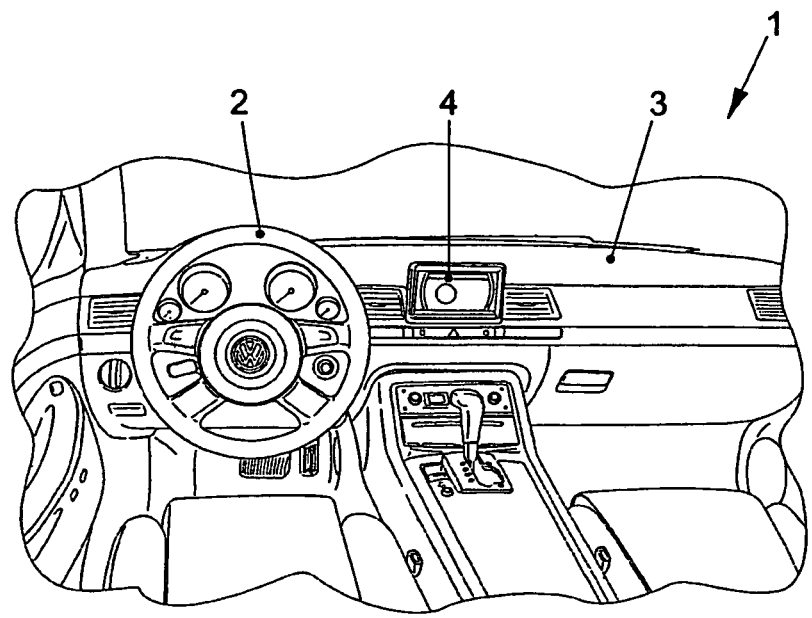
FIG. 1 illustrates an exemplary embodiment of an interior view of a motor vehicle.
Figure 2:
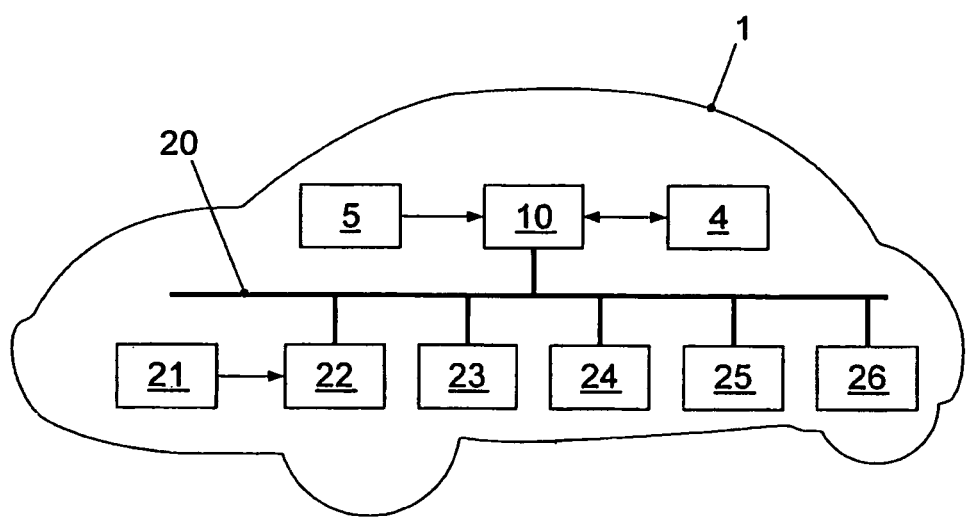
FIG. 2 illustrates the motor vehicle according to FIG. 1 in a basic representation.

FIG. 1 shows the interior view of a motor vehicle 1, which is represented in a schematic diagram in FIG. 2. Motor vehicle 1 includes a display and operating device 4 integrated in instrument panel 3, next to steering wheel 2, which may be structured in the manner of the input device described in U.S. Patent Application Publication No. 2006/0146037, for instance. In addition, motor vehicle 1 includes a display control 10 for the coordinated control of display and operating device 4 having display and operating device 5. Display control 10 is connected via a bus system 20 to a Bluetooth interface 22, a navigation system 23, an automatic temperature control 24, an infotainment system 25, and a vehicle control device 26. Using display and operating device 4, for example, navigation system 23, automatic temperature control 24, infotainment system 25, vehicle control device 26 and—via Bluetooth interface 22—a mobile telephone are able to be operated.

Figure 3:
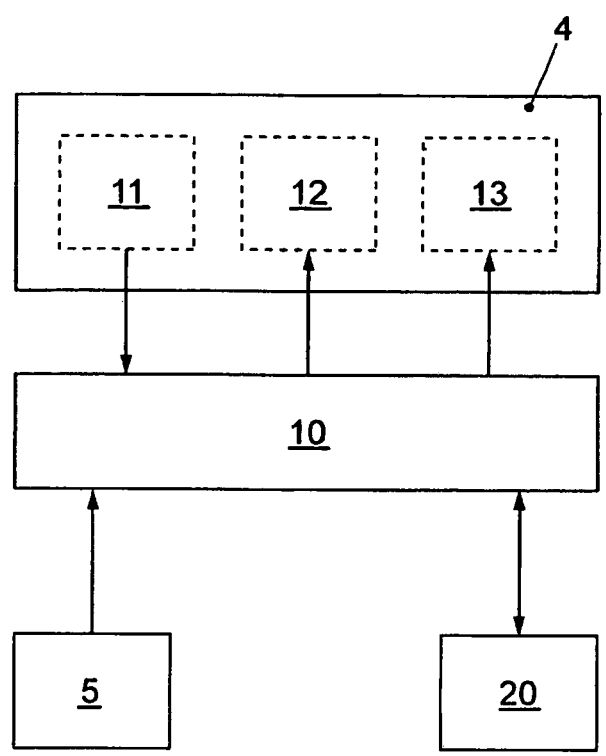
FIG. 3 illustrates a display and operating device.

Display and operating device 4 shown in exemplary form in FIG. 3 includes a display 12 for displaying variable information, and a touch screen 11, disposed above display 12, for inputting commands by touching touch screen 11. In this context it is provided, in particular, that an operating element for operating a function of motor vehicle 1 is displayed via display 12, by touching touch screen 11 in the region of the operating element. If touch screen 11 is touched in the region of the operating element, the corresponding function of motor vehicle 1 will be executed.

Furthermore, motor vehicle 1 includes a gesture recognition module 5 for recognizing a gesture executed in the vicinity of touch screen 11 in order to implement the function of motor vehicle 1. Gesture recognition module 5 may be limited to a pure sensor array, in which the analysis of a hand gesture may be implemented in display control 10. As an alternative, however, it may also be the case that the analysis of gestures takes place in gesture recognition module 5, and that already analyzed commands are transmitted to display control 10. Both arrangements of gesture recognition module 5 constitute exemplary embodiments for a gesture recognition module.

Figure 4:
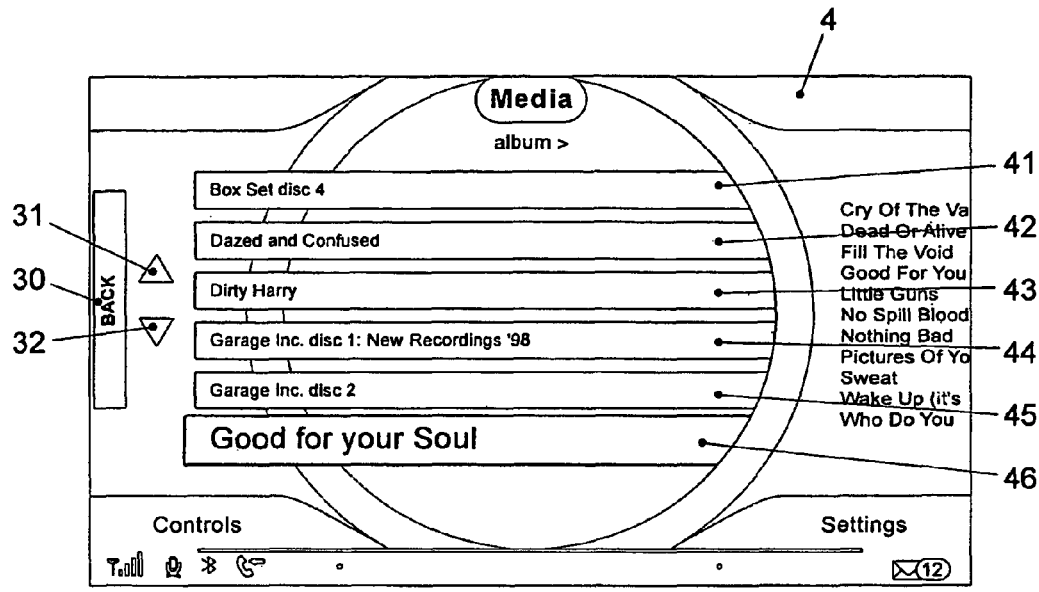
FIG. 4 illustrates an exemplary embodiment of a screen form for selecting an album or a CD.
Figure 5:
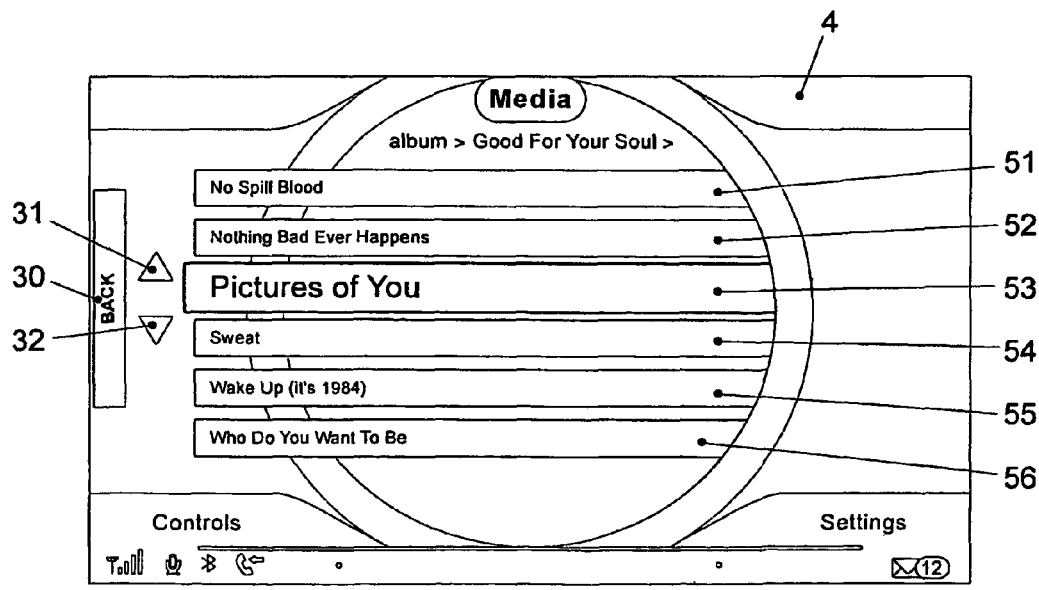
FIG. 5 illustrates an exemplary embodiment of a screen form for selecting a title.

One function of motor vehicle 1 that is controllable by touch screen 11 and gesture recognition module 5, for example, may be the selection of an album or a CD in a CD changer, or the selection of a title from an album or a CD, as shown in FIG. 4 and FIG. 5 for example. FIG. 4 shows a list of available albums or CDs, the individual entries of the list being denoted by reference numerals 41, 42, 43, 44, 45, and 46. It may be provided that an album is selected by touching touch screen 11 in the region of the corresponding list entry 41, 42, 43, 44, 45, and 46.

Moreover, an operating element 30 is shown; touching of touch screen 11 in the region of operating element 30 results in a return to a superposed menu. Reference numerals 31 and 32 denote scroll buttons shown by display 12. For example, if touch screen 11 is touched in the region of scroll button 32, then the highlighting of individual list entries moves in a downward direction. In the example shown in FIG. 4, the highlight is assigned to list entry 46.

Instead of touching touch screen 11, gesture recognition module 5, for example, makes it possible for a downward gesture to likewise result in downward shifting of a highlighted list entry 41, 42, 43, 44, 45, 46. Thus, a corresponding gesture corresponds to touching of touch screen 11 in the region of scroll element 32. If a gesture toward the left takes place, then this too results in a return to a superposed menu. Thus, such a gesture corresponds to touching of touch screen 11 in the region of operating element 30. If an upwardly directed gesture occurs, then this corresponds to touching of touch screen 11 in the region of scroll button 31.

If a list entry 41, 42, 43, 44, 45, 46 is highlighted for a specific period of time, then it will be selected. In the present exemplary embodiment, the album 'Good for your Soul' is selected and thus the display of the titles of this album, as shown in FIG. 5 for example. List entries 51, 52, 53, 54, 55, 56 are shown as the titles. The selection of a title, for example, may be made in the same manner as described with reference to FIG. 4 for the selection of an album or a CD. That is to say, a title may once again be selected both by touching touch screen 11 and by a corresponding gesture, which is recognizable by gesture recognition module 5.

Figure 6:
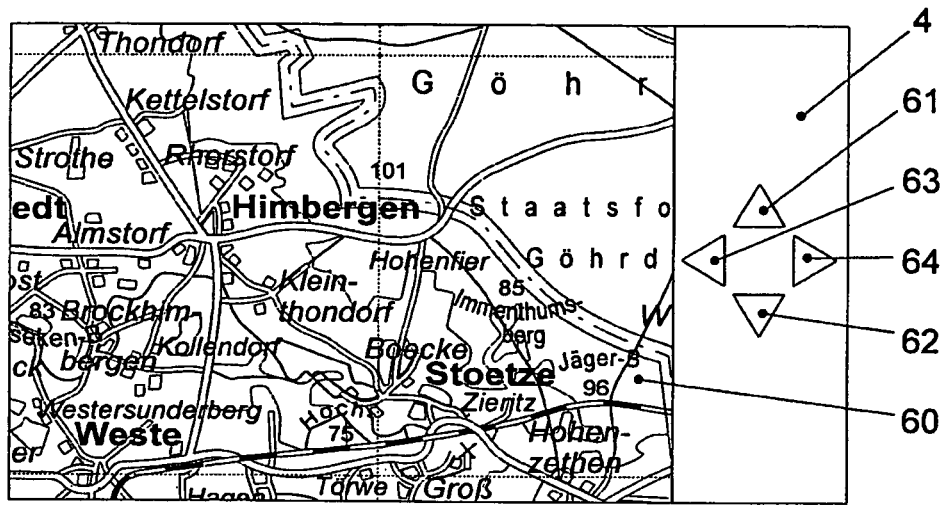
FIG. 6 illustrates an exemplary embodiment of a map detail displayed with the aid of a display and operating device.
Figure 7:
FIG. 7 illustrates an exemplary embodiment of the display of a shifted map detail with the aid of a display and operating device.

In the exemplary embodiment shown in FIG. 6, a map detail 60 is shown with the aid of display and operating device 4. Furthermore, operating elements 61, 62, 63, and 64 are shown, and touching of touch screen 11 in the region of correspondingly displayed operating element 61, 62, 63 and 64 shifts map detail 60 (in an upward, downward, left or right direction). For example, if touch screen 11 is touched in the region of operating element 62, then map detail 60—as shown in FIG. 7—is shifted in a downward direction.

Figure 8:
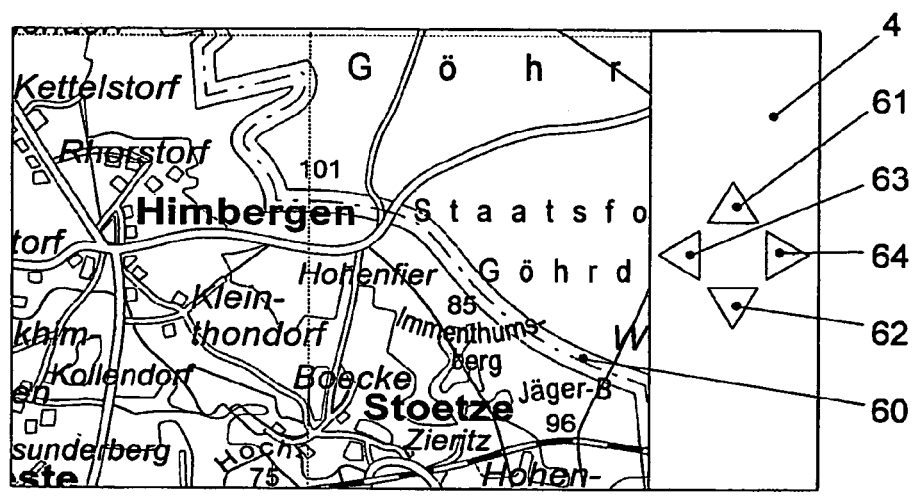
FIG. 8 illustrates an exemplary embodiment of a map detail shown in an enlarged view, with the aid of a display and operating device.

In addition, map detail 60 is able to be moved in the same manner by gestures. For example, in response to a downward wave, map detail 60, as shown in FIG. 7, is shifted in the downward direction. In other words, downward waving elicits the same function as touching of touch screen 11 in the region of operating element 62. If waving in a direction toward display and operating device 4 occurs, then map detail 60, as shown in FIG. 8, is zoomed (shown in an enlarged view).

LIST OF REFERENCE NUMERALS

1 Motor vehicle
2 Steering wheel
4 Operating device
5 Gesture recognition module
10 Display control
11 Touch screen
12 Display
13 Actuator
20 Bus system
21 Mobile telephone
22 Bluetooth interface
23 Navigation system
24 Automatic temperature control
25 Infotainment system
26 Vehicle control device
30, 61, 62, 63, 64 Operating element
31, 32 scroll button
41, 42, 43, 44, 45, 46, 51, 52, 53, 54, 55, 56 List entry
60 Map detail

What is claimed is:

1. A motor vehicle, comprising:
a display device adapted to display variable information;
a touch screen arranged above the display;
a control device adapted to display on the display device an operating element for operating a function of the motor vehicle by touch of the touch screen; and
a gesture recognition module adapted to recognize a gesture to execute the function of the motor vehicle without touching the touch screen, the function of the motor vehicle including scrolling through a list, shifting a map detail or scaling a map detail;
wherein the control device is adapted to change the touch screen from a display mode to an operating mode in response to the recognition of an approach gesture towards the touch screen, wherein, in the operating mode, the touch screen is configured to execute the function of the motor vehicle by the touch of the touch screen.

2. The motor vehicle according to claim 1, wherein the touch screen is adapted to input commands by touching of the touch screen.

3. The motor vehicle according to claim 1, wherein the operating element is adapted to operate a function of the motor vehicle by touch of the touch screen in a region of the operating element.

4. The motor vehicle according to claim 1, wherein the gesture recognition device is adapted to recognize a gesture executed in a vicinity of the touch screen.

5. The motor vehicle according to claim 1, wherein the control device is adapted to execute the function of the motor vehicle.

6. The motor vehicle according to claim 1, wherein the control device is adapted to transmit a signal to execute the function of the motor vehicle.

7. The motor vehicle according to claim 1, further comprising an actuator adapted to generate haptic feedback upon touch of the touch screen.

8. The motor vehicle according to claim 1, wherein the function of the motor vehicle includes moving an element displayed on the display.

9. The motor vehicle according to claim 1, wherein the motor vehicle is adapted to perform a method including:
- displaying, on the display device, the operating element for operating the function of the motor vehicle by touching the touch screen; and
- executing the function of the motor vehicle in response to a gesture of a hand executed in a vicinity of the touch screen.

10. The motor vehicle according to claim 1, wherein the motor vehicle is adapted to perform a method including:
- displaying a map detail with the aid of the display device; and
- at least one of (a) scaling and (b) shifting the map detail in response to a gesture of a hand executed in a vicinity of the touch screen, without touching the touch screen.

11. A method for operating a motor vehicle having a display device adapted to display variable information, and a touch screen, arranged above the display, comprising:
- displaying, on the display device, an operating element for operating a function of the motor vehicle by touching the touch screen;
- executing the function of the motor vehicle in response to a gesture of a hand executed in a vicinity of the touch screen without touching the touch screen, the function of the motor vehicle including scrolling through a list, shifting a map detail or scaling a map detail; and
- changing the touch screen from a display mode to an operating mode in response to an approach gesture towards the touch screen, wherein, in the operating mode, the touch screen is configured to the touch screen is configured to execute the function of the motor vehicle by the touch of the touch screen.

12. The method according to claim 11, wherein the touch screen is adapted to input commands by touching of the touch screen.

13. The method according to claim 11, wherein the operating element is adapted to operate the function of the motor vehicle by touching the touch screen in a region of the operating element.

14. The method according to claim 11, wherein the function of the motor vehicle includes moving an element displayed on the display.

15. The method according to claim 11, wherein the motor vehicle includes:
- a control device adapted to display on the display device the operating element for operating the function of the motor vehicle by touch of the touch screen; and
- a gesture recognition module adapted to recognize the gesture to execute the function of the motor vehicle.

16. The method according to claim 11, further comprising:
- displaying a map detail with the aid of the display; and
- at least one of (a) scaling and (b) shifting the map detail in response to a gesture of a hand executed in a vicinity of the touch screen, without touching the touch screen.

17. A method for operating a motor vehicle having a display adapted to display variable information, and a touch screen, arranged above the display, comprising:
- displaying a map detail with the aid of the display;
- at least one of (a) scaling and (b) shifting the map detail in response to a gesture of a hand executed in a vicinity of the touch screen, without touching the touch screen; and
- changing the touch screen from a display mode to an operating mode in response to an approach gesture towards the touch screen, wherein, in the operating mode, the touch screen is configured to the touch screen is configured to execute the function of the motor vehicle by the touch of the touch screen.

18. The method according to claim 17, wherein the touch screen is adapted to input commands by touching of the touch screen.

19. The method according to claim 17, wherein a location of the map detail shown with the aid of the display is subsequently selected as a destination for a route navigation by touching the touch screen.

20. The method according to claim 17, wherein the motor vehicle includes:
- a control device adapted to display on the display device the operating element for operating the function of the motor vehicle by touch of the touch screen; and
- a gesture recognition module adapted to recognize the gesture to execute the function of the motor vehicle.

21. The method according to claim 17, further comprising:
- displaying, on the display device, an operating element for operating a function of the motor vehicle by touching the touch screen; and
- executing the function of the motor vehicle in response to a gesture of a hand executed in a vicinity of the touch screen.

* * * * *